United States Patent [19]

Boisson

[11] Patent Number: 4,860,314
[45] Date of Patent: Aug. 22, 1989

[54] DIFFERENTIAL PULSE CODE MODULATION ARRANGEMENT, ASSOCIATED DECODING ARRANGEMENT AND TRANSMISSION SYSTEM COMPRISING AT LEAST SUCH AN ENCODING OR DECODING ARRANGEMENT

[75] Inventor: Jean-Yves Boisson, Clamart, France

[73] Assignee: Telecommunications Radioelectriques Et Telephoniques T.R.T, Paris, France

[21] Appl. No.: 84,658

[22] Filed: Aug. 11, 1987

[30] Foreign Application Priority Data

Aug. 13, 1986 [FR] France ................... 86 11686

[51] Int. Cl.⁴ .......................................... H04B 14/06
[52] U.S. Cl. ....................................... 375/27; 358/13; 358/135; 332/11 D
[58] Field of Search ................... 375/27; 358/135, 136, 358/138, 13, 133; 332/11 R, 11 D

[56] References Cited

U.S. PATENT DOCUMENTS

| | | | |
|---|---|---|---|
| 4,075,655 | 2/1978 | Iijima et al. | 358/13 |
| 4,636,856 | 1/1987 | Starck | 375/27 |
| 4,713,828 | 12/1987 | Mehrgardt | 358/135 |
| 4,723,161 | 2/1988 | Koga | 358/135 |

OTHER PUBLICATIONS

S. Knauer, "Distributed VLSI Processors for Picture Coding", IEEE International conference on Communications (May 14–17, 1984), vol. 2, pp. 718–723.

P. Pirsch, "Design of DPCM Quantizers for Video Signals Using Subjective Tests", IEEE Transactions on Communications, vol. Com.-29, No. 7 (Jul. 1981), pp. 990–1000.

Primary Examiner—Robert L. Griffin
Assistant Examiner—Marianne Huseman
Attorney, Agent, or Firm—Thomas A. Briody; Jack E. Haken; Anne E. Barschall

[57] ABSTRACT

This encoding arrangement has an input (12) for receiving a sequence of samples to be encoded, an output for supplying encoded samples, processing circuits, more specifically:

a differential circuit (20) for producing differential samples between the samples to be encoded and prediction samples, a prediction circuit (22) to produce prediction samples from the encoded samples.

It is characterized in that the processing circuits are separated into encoding units (E1, E2, E3 and E4) for each effecting a processing operation on each sample to be encoded and that an interleaving member (60) is provided to convert the sequence of samples to be encoded into a sequence of interleaved samples so as to ensure that all the processing operations to be effected on a sample are indeed effected.

11 Claims, 6 Drawing Sheets

DIFFERENTIAL PULSE CODE MODULATION ARRANGEMENT, ASSOCIATED DECODING ARRANGEMENT AND TRANSMISSION SYSTEM COMPRISING AT LEAST SUCH AN ENCODING OR DECODING ARRANGEMENT

BACKGROUND OF THE INVENTION

1. Field of the Invention

The invention relates to a differential pulse code modulation arrangement having an input for receiving a sequence of samples to be encoded, an output for supplying encoded samples, processing circuits, more specifically:
- a differential circuit for producing differential samples between the samples to be encoded and prediction samples,
- a prediction circuit to produce prediction samples from encoded samples.

2. Prior Art

An encoding arrangement of this type is used with particular advantage in digital television.

In this type of usage, the problem is the speed of the processing operations to be effected. Actually, if one wants to encode a television picture at a picture element rate of 13.5 MHz, an interval of 74 ns is available for a processing operation.

When locking into conventional differential pulse modulation arrangements, it appears that this 75 ns interval, once it has been distributed over the operation to be effected by the differential circuit, by the prediction circuit and also by other circuits - such as the quantizing circuits etc. ... - is not long enough for the available circuits.

For that reason it has been proposed to effect different operations in parallel by the processors: see the article "DISTRIBUTED VLSI PROCESSORS FOR PICTURE CODING", by S. C. Knauer, published in ICC 84 Conf. Rec. (Amsterdam, Netherlands, May 84), pages 718–723.

The arrangement described in said article has the following disadvantage: it requires the same number of processors as there are parallel operations to be effected, not counting the interconnection circuits to be provided between the processors.

SUMMARY OF THE INVENTION

The present invention has for its object to provide a coding arrangement of the type set forth in the opening paragraph which to a large extent obviates the said disadvantage and which consequently is of a simpler construction.

Such an arrangement is characterized in that separating means are provided for separating the processing circuits into encoding units to provide that the processing operations of each unit are effected independently of the other units and also an ordering member to provide the sequences of samples to be encoded as a sequence of ordered samples to ensure that the processing operations effected on a sample are performed in a coherent manner.

The invention also relates to an associated decoding arrangement and a transmission system comprising at least such an encoding or decoding arrangement.

BRIEF DESCRIPTION OF THE DRAWING

The following description, given by way of example with reference to the accompanying drawings will make it better understood how the invention can be put into effect.

DETAILED DESCRIPTION OF THE PREFERRED EMBODIMENT

Figure 1:
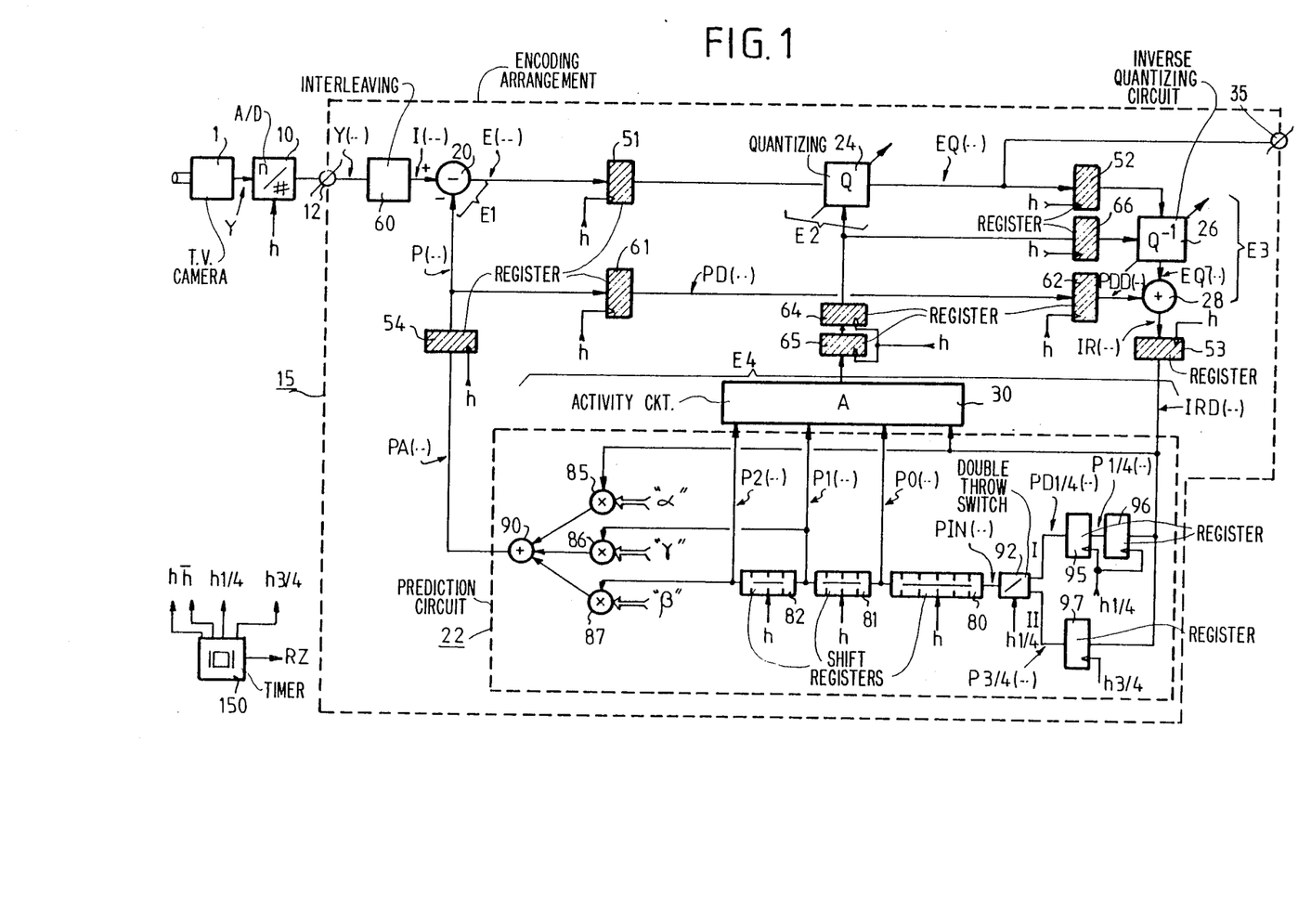
FIG. 1 shows an encoding arrangement according to the invention.

In FIG. 1, reference numeral 1 denotes a television camera which produces the "Y" information about the luminance of the picture. An analog-to-digital converter 10 applies the different digital samples representing this luminance signal to the input 12 of the encoding arrangement 15 in accordance with the invention.

The encoding arrangement comprises:
- a differential circuit 20 for producing the difference between a sample coming from the input 12 and another sample coming from a prediction circuit 22,
- a quantizing circuit 24 for reducing the number of bits of the result produced by the differential circuit,
- an inverse quantizing circuit 26,
- an adder circuit 28 for adding a sample received from the prediction circuit 22 to the sample produced by the inverse quantizing circuit 26,
- an activity circuit 30 cooperating with the prediction circuit which acts on the quantizing circuit 24 and on the inverse quantizing circuit 26. A definition of this notion "activity" can be found in the article by Peter PIRSCH "Design of DPCM Quantizers for Video Signals Using Subjective Tests", published July 1981 in the periodical "IEEE Transactions on Communications", Vol. COM-29, No. 7.

The activity defines a luminance transition between the picture elements. The activity is greater when the transition is more abrupt. A coarse characteristic is associated with great activity, since it will be shown that it is not necessary to encode with precision the level situated on either side of the transition. Consequently a finer characteristic is associated with a weaker activity.

The word encoded by the arrangement 15 ultimately appears at the output terminal 35 which is connected to the output of the quantizing circuit 24.

In accordance with the invention, the arrangement is characterized in that it is divided into four circuit sections E1, E2, E3 and E4, and in that interleaving means are present to provide that each of these sections effects different operations.

The section E1 is constituted by the differential circuit 20, the section E2 by the quantizing circuit 24, the section E3 by the inverse quantizing circuit 26 and the adder circuit 28 and the section E4 by the prediction circuit 22 in combination with the activity measuring circuit 30.

The different circuit sections are separated by a first series of registers 51, 52, 53 and 54, which are placed between the respective sections E1 and E2, between E2 and E3, between E3 and E4, and between E4 and E1; in addition, an interleaving circuit 60 is present to provide that two consecutive samples at its input are separated by three samples at its output. The encoding arrangement 15 also includes a second series of registers 61, 62, 64, 65 and 66 for delaying different information components; the registers 61 and 62 of this second series connect the output of the register 54 to an input of the adder 28, the registers 64 and 65 connect the output of the activity measuring circuit 30 to the quantizing control input of the circuit 24 and the register 66 connects the output of the register 64 to the input of the inverse quantizing control circuit 26.

Figure 2:
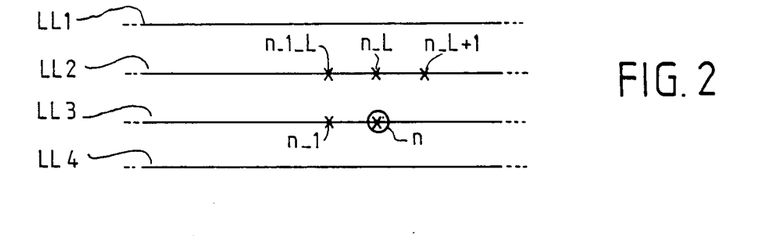
FIG. 2 shows some scanning lines of a television picture.

FIG. 2 shows some lines LL1, LL2, LL3 and LL4 for the decomposition of a television picture effected by the camera 1. Each line is also broken up into "L" picture elements (pels). Let Y(n) be the luminance of a pel(n) in the line LL3. The prediction circuit 22 will determine the prediction value P(n) with respect to Y(n) from adjacent pels: the preceding pel "(N-1)" located in the same line LL3 and two pels on the preceding line LL2: "n-1-L" and "n-L".

The predicted luminance P(n) of these pels is a function of the luminance values IR(. .) established at the output of the adder 28 such that it is possible to write:

$$P(n) = \alpha IR(n-1) + \beta IR(n-1-L) + \gamma IR(n-L) \quad (1)$$

where for example:
$\alpha = 0,8125$
$\beta = -0,5625$
$\gamma = 0,75$

The activity measuring circuit 30 determines the value ACT(n) for the pel "n":

$$ACT(n) = Max|IR(i) - IR(j)| \quad (2)$$

where "i" and "j" $= n-1$, $n-1-L$, $n-L$ and $n-L+1$ and $i \neq j$

As a result thereof the identification will be made:
$IR(n-L+1) = P0$
$IR(n-L) = P1$
$IR(n-L-1) = P2$
$IR(n-1) = IRD$ The different values P0, P1, P2 are obtained from the respective different cascaded shift registers 80, 81 and 82. The register 80 has six positions whilst the registers 81 and 82 have four positions. The value IRD is determined by the output signal of the register 53.

In order to obtain the prediction, three multiplying members 85, 86 and 87 are used which multiply the respective information components IRD, P1 and P2 by $\alpha$, $\gamma$, and $\beta$, and finally an adder member 90 produces the prediction value from the results processed by the members 85, 86 and 87.

The input of the shift register 80 is connected to the output of a double-throw switch 92. When this switch is adjusted to its first position (I), it connects the input of the shift register 80 to the output of an assembly of two cascade-arranged registers 95 and 96, the input of this assembly is connected to the output of the register 53. When the switch 92 is adjusted to its second position (II), the input of the shift register 80 is connected to the output of a register 97 whose input is also connected to the output of the register 53.

Figure 3:
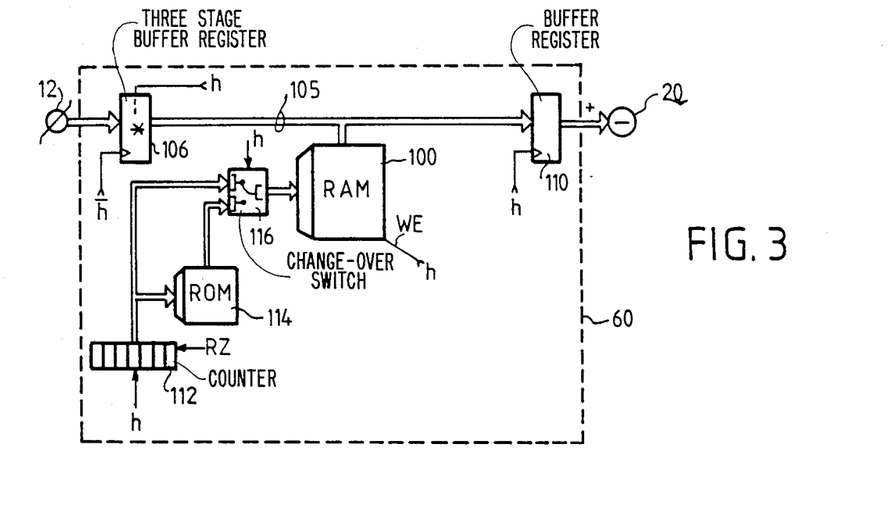
FIG. 3 shows an interleaving member.

FIG. 3 shows in detail the interleaving circuit 60. It is formed on the basis of a random access memory 100; this memory stores and outputs data on a common line 105 which is connected to the output of a three-stage buffer register 106; the input of this register is connected to the terminal 12. The data to be registered are obtained from the input terminal 12 via the register 106 and the data obtained from the memory 100, or having been submitted to the operation of the differential circuit 20, pass through a buffer register 110. This memory 100 is written in accordance with an address code provided by a counter 112 and is read in accordance with an address code provided by a read-only memory 114, the latter memory being addressed by the counter 112. This memory 114 then effects a translating operation. A change-over switch 116 renders it possible for either a code supplied by the counter 112 or a code coming from the output of the read-only memory 114 to serve as an address code for the memory 100.

Figure 4:
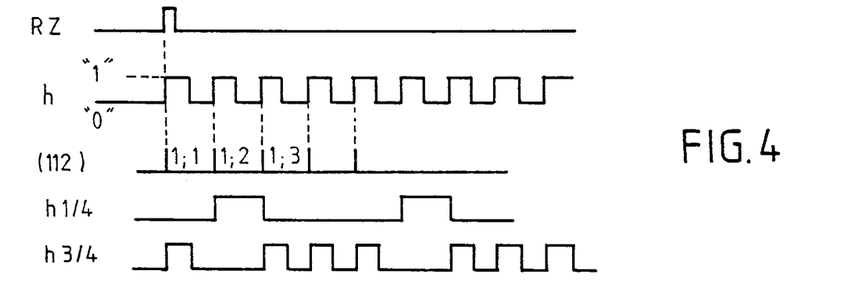
FIG. 4 shows the shapes of some signals used in the coding arrangement according to the invention.

All the operations effected by the encoding arrangement according to the invention are performed at the rate of the signal h, $\bar{h}$, h$\frac{1}{4}$, h$\frac{3}{4}$ and RZ, which are produced by a time base 150. The shape of the signals is shown in FIG. 4.

The signals "h" are applied to the analog-to-digital converter 10 under the control of the registers 51, 52, 53, 54, 61, 62, 64, 65, 66, 110 (FIG. 3), under the shift control of the registers 80, 81 and 82, under the write-read control WE of the memory 100, under the change-of-position control of the change-over switch 116, to the incrementing input of the counter 112 and to the adjust-to-the-open-state output of the register 106.

The signals $\bar{h}$ which are the complements of the signal h are applied to the write control of the register 106.

The signals h$\frac{1}{4}$ are applied to the write control of the registers 95 and 96 and to the change-of-position control of the change-over switch 92; the signals h$\frac{3}{4}$ are applied to the write control of the register 97 and finally the signals RZ reset the content of the counter 112 to zero to provide that the content of this counter corresponds to a predetermined value which will be described hereinafter, when the signal h$\frac{1}{4}$ is active.

For a better understanding of how the arrangement according to the invention operates, let it be assumed that each picture line includes only six pels. It will then be easy for a person skilled in the art to apply this concept to any number of pels per line.

The memory 100 has a capacity which is sufficiently large to contain the information about sixty-four picture elements distributed over four lines, each divided into four sections PL1, PL2, PL3 and PL4. FIG. 4 shows the signals which control the manner in which the memory 100 is written and read. They are the logic values of the signals "h" which determine reading and writing of this memory; for h=0, writing then occurs for h=1, the reading operation is effected and it is assumed that the content of the counter 112 is incremented by one unit at each transition from 0 to 1 of the value of the signals "h". Consequently, for each value of the counter 112 a reading operation h=1 is first performed and thereafter writing of the memory 100 (h=0) is effected. The different address codes for writing WAD and for reading RAD are represented by two digits separated by ";", the first digit indicating the number of the line and consequently extending from 1 to 4, whilst the second digit indicates the location on the line and consequently extends from 1 to 16. The samples appearing at the output of the register 106 are successively stored for the values "h"=0 in all the cells of the memory 100. At this value h=0 addressing the memory is effected by the content of the counter 112 via the change-over switch 116 which is in the appropriate position. The memory 112 is adjusted to the write state by this same signal "h" applied to the control WE. The codes WAD, which are supplied by this counter continuously evolve from 1;1 to 1;16 to store the sixteen pels of a line LL1, thereafter from 2;1 to 2;16 for storing the pels of the subsequent line LL2, thereafter from 3;1 to 3;16 for the pels of the line LL3 and finally from 4;1 to 4;16 for the pels of the line LL4 and the cycle restarts with the code WAD: 1;1. . . .

Figure 5:
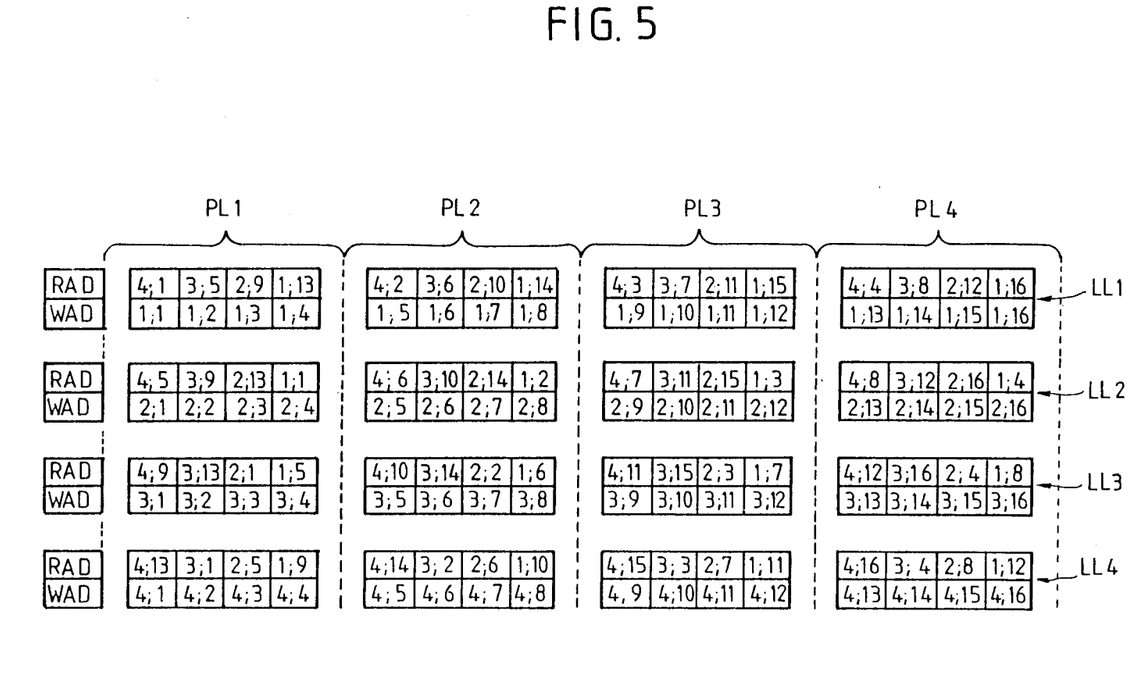
FIG. 5 shows how the interleave is realised.

When h=1, the switch 116 is switched over, the memory 100 is addressed by the output code RAD of the read-only memory 114, the control WE authorizes reading of this memory. Thus, the code WAD (1;1) is generated immediately after the read code RAD (4;1) which corresponds to the first pel of the quarter line PL1 of line 4; thereafter the read code (1;2) immediately follows after the read code (3;5), that is to say the first pel of the quarter line PL2 of line 3 and so forth. It will be clear that the reading operation is effected starting by the first pel of the quarter PL1 of the line LL4, thereafter by the pel of PL2 of line LL3, thereafter by thepel of PL3 of line LL2, this continues with the pel of the quarter line PL4 of the line LL1; there, a change is thereafter made to the second pel of the quarter line PL1 of the line LL4 and so forth. If then the sequence of pels at the output of the register 0.110 is examined, the addresses are: (4;1) (3;5) (2;9) (1;13) (4;2) . . . . Consequently there are three pels between two consecutive pels (4;1) and (4;2). The sample interleave is illustrated in FIG. 5. In this Figure one can see that two consecutively stored elements are separated, on reading, by three elements.

It is now possible to follow the routing of the different information components within the encoding arrangement of the invention. This routing is effected at the rate of the rising transitions in the signals "h".

Let it be assumed that at a given instant "t1" (see FIG. 6), the information I(3;5) at the output of the circuit 60 relates to the element (3;5); a difference E formed by the circuit 20 corresponding to this element corresponds to said information which can be written as: E(3;5), this information E(3;5) results in an information EQ(3;5) at the output of the quantizing circuit 24, at the instant "t2". The information IR (3;5) is obtained at the instant "t3", at the output of the adder circuit 28. The information IRD (3;5) is obtained at the output of the register 53 at the instant "t4". This information IRD(3;5) is applied to the prediction circuit 22. As can be seen from formula (1) which relates to the prediction, the output signal PA relates to the following picture element: it is then written: PA (3;6); the prediction information P(3;6) which occurs at the instant "t5" appropriately corresponds to the picture element I(3;6) occurring at that instant.

Figure 6:
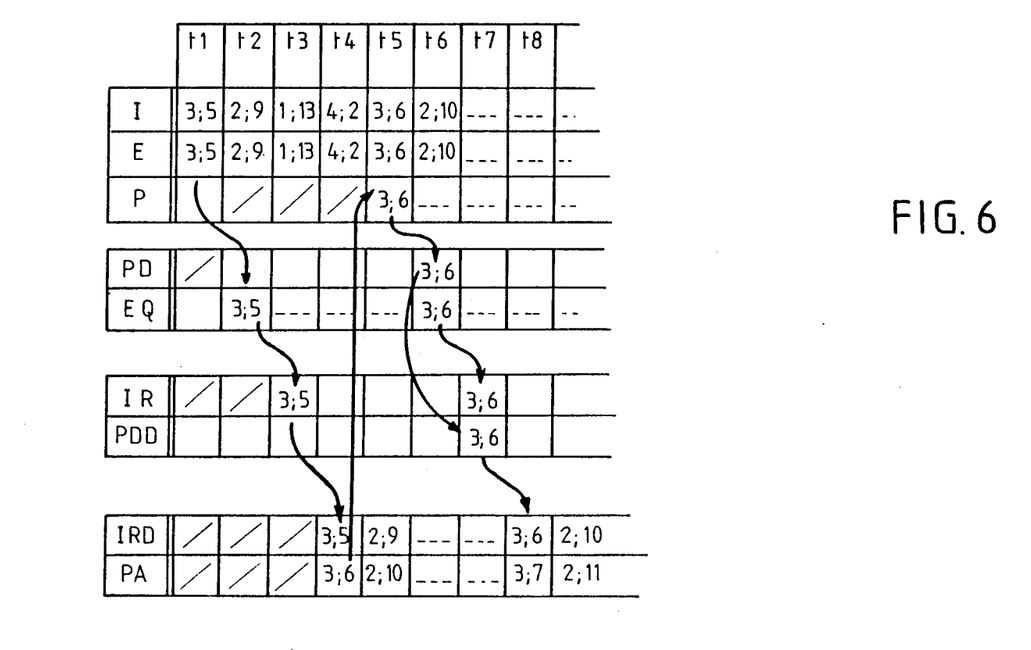
FIG. 6 shows the routing of the samples in the encoding arrangement of the invention.

The prediction information PD(3;6) occurring at the instant "t6" appears at the output of the register 61 simultaneously with the information EQ(3;6) at the output of the quantizing circuit 24, so that at the instant "t7" the adder circuit 28 will perform the adding operation IR(3;6) of the information components relating to the same picture element:

$$IR(3;6) = PDD(3;6) + EQ^{-1}(3;6)$$

if the information components at the outputs of the register 22 and the inverse quantizing circuit 26, respectively are designated VDD and $EQ^{-1}$.

Figure 7:
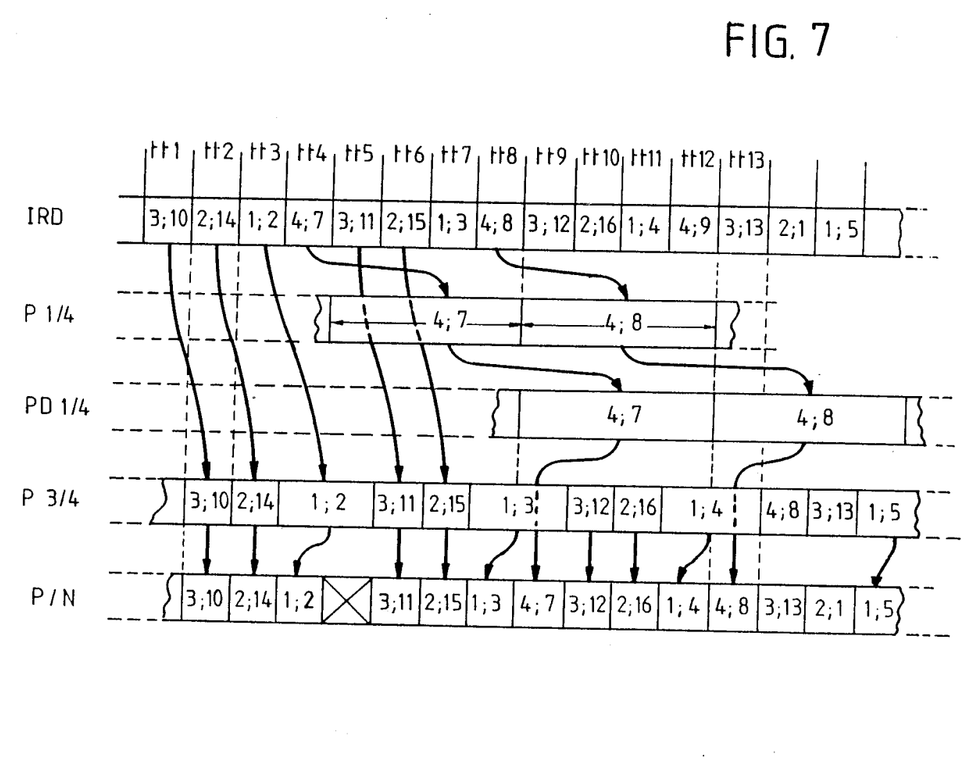
FIG. 7 shows the routing of the samples in the prediction circuit.

Now a more detailed examination will be made of the routing of the information components within the prediction circuit 22 (see FIG. 1). Starting point is the instant "tt1" where the information IRD (3;10) is available, this information is stored in the register 97 by an active transition in the signal $h_1^3$ and, at the instant "tt2", becomes the information $P_4^3(3;10)$ at the output of the register 97 and since the switch 92 is in the position II, the input information P(IN) of the shift register 80 always relates to this picture element (3;10); at the instants "tt2" and "tt3" the information components IR(2;14) and IRD(1;2) appear which follow the same path as the preceding information and at the input of the shift register 80 the information components PIN(2;14) and PIN(1;2) are available at the instants "tt3" and "tt4".

When the information IRD(4;7) appears, the signals $h_4^1$ become active and the signals $h_4^3$ become inactive so that from instant "tt5", the information $P_4^1(4;7)$ is obtained at the output of the flip-flop 96. This information remains there until the instant "tt9" where, once again, the signals $h_4^1$ become active. Then the information $PD_4^1(4;7)$ is obtained at the output of the register 95 and, hence, at the input of the register 80 the information PIN(4;7) is available at the instant "tt9". The information PIN(4;8) is found at the instant "tt13". If the sequence of information components IRD and the sequence of the information components PIN are considered, it will be noted that there is a shift of the information components in the line 4. Thus, the pel (4;7) is found in the position of the pel (4;8) and the pel(4;8) in the position of the pel (4;9) etc. . . .

The information IRD(3;10), used to provide the prediction PA(3;11) must also be employed for the prediction of PA(4;10) and PA(4;11). The prediction PA(4;10) must be effected when IRD(4;9) appears, that is to say at the instant "tt12". An information P1(3;10) must be present at the output of the register 81 and an information P2(3;9) at the output of the register 82, which is easy to check. It will be noted that shifting the elements (4; . . .) at the imput of the register 80 renders it possible to preserve the appropriate information component for the predictions relative to the line 1.

It is easy to check that the activity measurement effected for any pel is appropriately effected on the neighbouring pels as defined in formula (2).

Taking account of the different delays: it can be derived therefrom that the signal $h_4^1$ must be active for a content of the counter 112(1;2) and reproduce itself periodically with a period equal to four times that of the signal "h" (FIG. 4).

It will be obvious that several variations can be realised without departing from the scope of the invention. Thus, instead of grouping two circuits in four units, it would be possible to do so in two units. In that case, the circuit 60 will convey two picture lines and will be read half by half instead of quarter by quarter. Although this circuit has been described for an array of lines having 16 picture elements, the invention of course also covers the case in which these lines comprise a much higher number of picture elements. Thus in a general way, the lines are formed from 4N picture elements (this holds for the situation in which there are four units). It can be demonstrated that the register 80 has 4N-10 positions.

Figure 8:
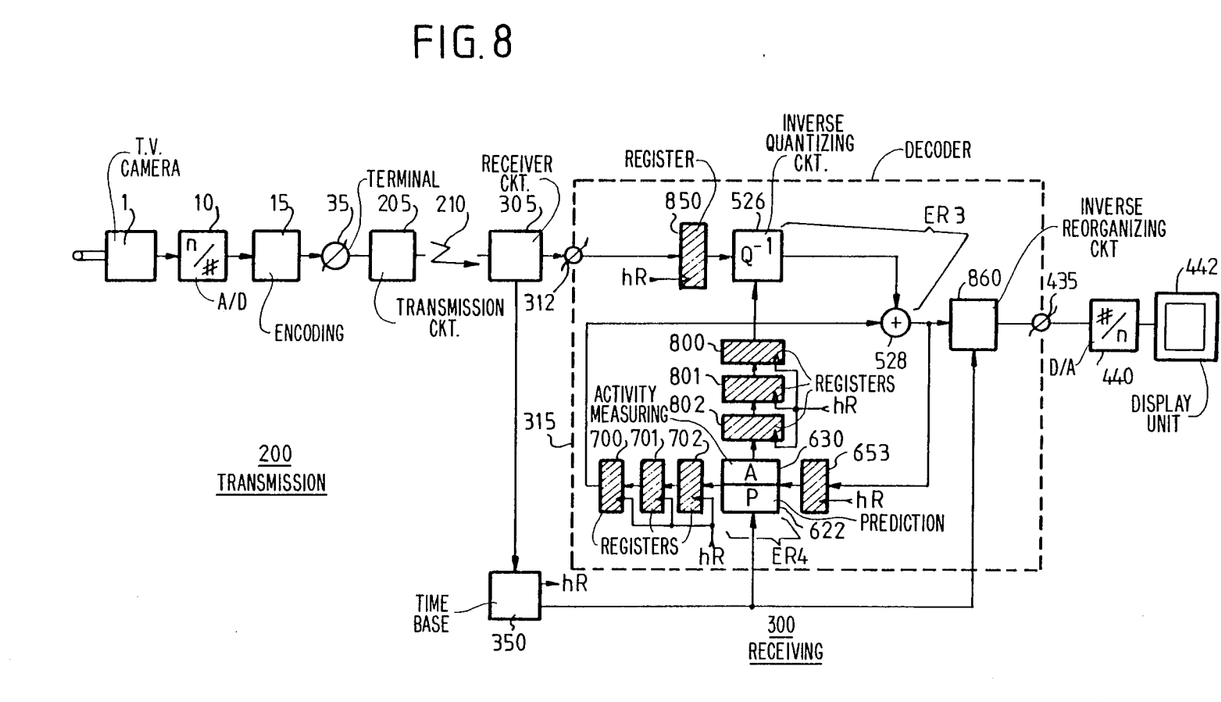
FIG. 8 shows: on the one hand a decoding arrangement in accordance with the invention and also a transmission system in accordance with the invention.

FIG. 8 shows a transmission system according to the invention. It is formed by a transmission section 200 comprising the elements which were already shown in FIG. 1 and in addition a transmission circuit 205 intended to act as an interface between the data available at the terminal 35 and the transmission medium denoted by an arrow 310 and also a receiving section 300; this section 300 comprises a receiver circuit 305 which, from the signals coming from the transmission means, applies data to an input terminal 312 of a decoder circuit 315 in accordance with the invention and which consequently, is associated with the encoding circuit 15. The circuit 305 also applies signals to a receiving time base 350. The signal decoded by the decoder 315 appears at the output terminal 435, they are thereafter converted to the analog form by the digital-to-analog converter 440 for display by a display unit 442. The decoder circuit 315 must correspond as much as possible to the encoder circuit 15. Furthermore, a circuit assembly ER3 is present, which comprises an inverse quantizing circuit 526 with an adder circuit 528, all this similar to the circuit E3 which comprises the circuit 26 and 28. There is also an assembly ER4 comprising the prediction and the activity measuring circuits 622 and 630 which are of an identical structure as the circuits 22 and 30. The circuit assemblies ER3 and ER4 are separated by a register 653. The adder circuit 528 receives the output signal from the prediction circuit 622 via the three cascaded registers 700, 701 and 702. Now also three cascade-arranged registers 800, 801 and 802 are provided between the output of the activity measuring circuit 630 and the inverse quantizing control circuit 526. The input 312 is connected to the input of the inverse quantizing circuit via a register 850. The output terminal 435 is connected to the output of the adder circuit via an inverse re-organizing circuit 860 whose structure is almost identical tothat of the circuit 60. The difference between the read-only memory is programmed differently to output the picture information components sequentially. The write controls of these different registers 653, 700, 701, 702, 800, 801, 802 and 850 receive the signals "hR" which represent the signals "h" recovered by the receiver time base which also supplies the useful signals for the prediction circuit 622 associated with the activity measuring circuit 630 and for the inverse re-organizing circuit 860.

What is claimed is:

1. A differential pulse code modulation apparatus comprising:
   a. an input for receiving a sequence of samples to be encoded;
   b. an output for supplying encoded samples;
   c. timing means;
   d. a plurality of encoding processing circuits grouped into a plurality of independent encoding units which operate in parallel and have respective timing inputs coupled with the timing means, the plurality of processing circuits including:
      i. means for reordering the samples to be encoded and supplying a sequence of reordered samples in an order;
      ii. means for producing differential samples of differences between the sequence of reordered samples and the prediction samples and having an output coupled with the output of the apparatus; and
      iii. means for producing prediction samples from the encoded samples;
   the order being chosen so that, under control of the timing means, the prediction samples are provided to the differential producing means simultaneously with corresponding ones of the sequence of reordered samples, and so that the independent encoding units process at least two of the reordered samples in parallel.

2. A differential pulse code modulation apparatus as claimed in claim 1 further comprising as encoding processing circuits:
   a direct quantizing circuit for controllably reducing a number of bits in the differential samples in accordance with a plurality of direct encoding characteristics, the direct quantizing circuit being coupled between the differential producing means and the output of the apparatus, so that the encoded samples are provided at an output of the direct quantizing circuit,
   an inverse quantizing circuit, having an input coupled with the output of the direct quantizing circuit, for controllably re-forming the differential samples quantized by the direct quantizing circuit in accordance with a plurality of inverse characteristics inverse to the direct characteristics,
   an activity measuring circuit for controlling the direct and inverse characteristics and having input means coupled with an output of the inverse quantizing circuit and having output means coupled with the direct and inverse quantizing circuits,
   an adder circuit coupled to supply samples representing a sum of the encoded samples and the prediction samples to the activity measuring circuit and to the prediction circuit.

3. The apparatus of claim 2 wherein
   a. a first one of the independent encoding units comprises the differential producing means;
   b. a second one of the independent encoding units comprises the direct quantizing circuit;
   c. a third one of the independent encoding units comprises the inverse quantizing circuit and the adder circuit; and
   d. a fourth one of the independent encoding units comprises the activity measuring circuit and the prediction circuit;
   whereby the independent encoding units process four of the reordered samples in parallel.

4. A decoding apparatus for use with a differential pulse code modulation encoding apparatus which includes:
   a. an input for receiving a sequence of samples to be encoded;
   b. an output for supplying encoded samples;
   c. timing means;
   d. a plurality of encoding processing circuits grouped into a plurality of independent encoding units which operate in parallel and have respective timing inputs coupled with the timing means, the plurality of processing circuits including:
      i. means for reordering the samples to be encoded and supplying a sequence of reordered samples in an order;
      ii. means for producing differential samples of differences between the sequence of reordered samples and the prediction samples and having an output coupled with the output of the apparatus; and
      iii. means for producing prediction samples from the encoded samples;
   the order being chosen so that, under control of the timing means, the prediction samples are provided to the differential producing means simultaneously with corresponding ones of the sequence of reordered samples, and so that the independent encoding units process at least two of the reordered samples in parallel; the decoding apparatus comprising:
    e. an input for receiving transmitted reordered encoded samples;
    f. an output for supplying decoded samples; and
    g. a plurality of decoding processing circuits, grouped into a plurality of independent decoding units which operate in parallel and have respective timing inputs, the plurality of decoding processing units including:
        i. an adder circuit for forming a sequence of recovered reordered decoded samples from the transmitted reordered samples and prediction samples;
        ii. a prediction circuit for supplying the prediction samples; and
        iii. a de-interleaving member for recovering an original order of the recovered reordered decoded samples, which de-interleaving member supplies to the output of the decoding apparatus a sequence of decoded samples in the original order; and
    h. timing means for controlling the decoding processing circuits so that the independent decoding units process at least two of the transmitted reordered encoded samples in parallel.

5. The arrangement of claim 4 wherein the encoding arrangement comprises as encoding processing circuits:
    a direct quantizing circuit for controllably reducing a number of bits in the differential samples in accordance with a plurality of direct encoding characteristics, the direct quantizing circuit being coupled between the differential producing means and the output of the encoding apparatus, so that the encoded samples are provided at an output of the direct quantizing circuit,
    an inverse quantizing circuit, having an input coupled with the output of the direct quantizing circuit, for controllably re-forming the differential samples quantized by the direct quantizing circuit in accordance with a plurality of inverse characteristics inverse to the direct characteristics,
    an activity measuring circuit for controlling the direct and inverse characteristics and having input means coupled with an output of the inverse quantizing circuit and having output means coupled with the direct and inverse quantizing circuits, and
    an adder circuit coupled to supply samples representing a sum of the encoded samples and the prediction samples to the activity measuring circuit and to the prediction circuit.

6. The apparatus of claim 5 wherein:
    a. a first one of the independent encoding units comprises the differential producing means;
    b. a second one of the independent encoding units comprises the direct quantizing circuit;
    c. a third one of the independent encoding units comprises the inverse quantizing circuit and the adder circuit; and
    d. a fourth one of the independent encoding units comprises the activity measuring circuit and the prediction circuit;
    whereby the independent encoding units process four of the reordered samples in parallel.

7. The arrangement of claim 5 further comprising, as decoding processing units:
    a. an inverse quantizing circuit for controllably re-forming the transmitted reordered encoded samples, which were quantized by the direct quantizing circuit of the encoding apparatus, according to inverse characteristics inverse to the direct characteristics of the direct quantizing circuit of the encoding apparatus; and
    b. an activity measuring circuit, coupled between the prediction circuit of the decoding apparatus and the inverse quantizing circuit of the decoding apparatus, for controlling the inverse characteristics of the inverse quantizing circuit of the decoding apparatus.

8. A transmission system comprising:
    a. A differential pulse code modulation encoding apparatus comprising:
        i. an input for receiving a sequence of samples to be encoded;
        ii. an output for supplying encoded samples;
        iii. timing means;
        iv. a plurality of encoding processing circuits grouped into a plurality of independent encoding units which operate in parallel and have respective timing inputs coupled with the timing means, the plurality of processing circuits including:
            A. means for reordering the samples to be encoded and supplying a sequence of reordered samples in an order;
            B. means for producing differential samples of differences between the sequence of reordered samples and the prediction samples and having an output coupled with the output of the apparatus; and
            C. means for producing prediction samples from the encoded samples;
the order being chosen so that, under control of the timing means, the prediction samples are provided to the differential producing means simultaneously with corresponding ones of the sequence of reordered samples, and so that the independent encoding units process at least two of the reordered samples in parallel; and
    b. a decoding apparatus comprising:
        i. an input for receiving transmitted reordered encoded samples;
        ii. an output for supplying decoded samples; and
        iii. a plurality of decoding processing circuits, grouped into a plurality independent decoding units which operate in parallel and have respective timing inputs, including
            A. an adder circuit for forming a sequence of recovered reordered decoded samples from the transmitted reordered samples and prediction samples;
            B. a prediction circuit for supplying the prediction samples; and
            C. a de-interleaving member for recovering an original order of the recovered reordered decoded samples, which de-interleaving member supplies to the output of the decoding apparatus a sequence of decoded samples in the original order; and
            i. timing means for controlling the decoding processing circuits so that the independent decoding units process at least two of the transmitted reordered encoded samples in parallel.

9. The system of claim 8 comprising as encoding processing circuits
- a direct quantizing circuit for controllably reducing a number of bits in the differential samples in accordance with a plurality of direct encoding characteristics, the direct quantizing circuit being coupled between the differential producing means and the output of the encoding apparatus, so that the encoded samples are provided at an output of the direct quantizing circuit,
- an inverse quantizing circuit, having an input coupled with the output of the direct quantizing circuit, for controllably re-forming the differential samples quantized by the direct quantizing circuit in accordance with a plurality of inverse characteristics inverse to the direct characteristics,
- an activity measuring circuit for controlling the direct and inverse characteristics and having input means coupled with an output of the inverse quantizing circuit of the encoding apparatus and having output means coupled with the direct and inverse quantizing circuits of the encoding apparatus, and
- an adder circuit coupled to supply samples representing a sum of the encoded samples and the prediction samples to the activity measuring circuit and to the prediction circuit.

10. The system of claim 9 wherein
- a. a first one of the independent encoding units comprises the differential producing means;
- b. a second one of the independent encoding units comprises the direct quantizing circuit;
- c. a third one of the independent encoding units comprises the inverse quantizing circuit and the adder circuit; and
- d. a fourth one of the independent encoding units comprises the activity measuring circuit and the prediction circuit;

whereby the independent encoding units process four of the reordered samples in parallel.

11. The system of claim 9 further comprising, as decoding processing units:
- a. an inverse quantizing circuit for controllably re-forming the transmitted reordered encoded samples, which were quantized by the direct quantizing circuit of the encoding apparatus, according to inverse characteristics inverse to the direct characteristics of the direct quantizing circuit of the encoding apparatus; and
- b. an activity measuring circuit, coupled between the prediction circuit of the decoding apparatus and the inverse quantizing circuit of the decoded apparatus, for controlling the inverse characteristics of the inverse quantizing circuit of the decoded apparatus.

* * * * *